(12) United States Patent
Benz et al.

(10) Patent No.: US 11,384,549 B2
(45) Date of Patent: Jul. 12, 2022

(54) SUPPORTING STRUCTURE HAVING INTEGRATED TURRET FOR A MOBILE CONCRETE PUMP AND MOBILE CONCRETE PUMP

(71) Applicant: Putzmeister Engineering GmbH, Aichtal (DE)

(72) Inventors: Andreas Benz, Wendlingen (DE); Dietmar Fügel, Wolfschlugen (DE)

(73) Assignee: Putzmeister Engineering GmbH, Aichtal (DE)

( * ) Notice: Subject to any disclaimer, the term of this patent is extended or adjusted under 35 U.S.C. 154(b) by 507 days.

(21) Appl. No.: 16/490,297

(22) PCT Filed: Mar. 2, 2018

(86) PCT No.: PCT/EP2018/055209
§ 371 (c)(1),
(2) Date: Aug. 30, 2019

(87) PCT Pub. No.: WO2018/158443
PCT Pub. Date: Sep. 7, 2018

(65) Prior Publication Data
US 2021/0087838 A1    Mar. 25, 2021

(30) Foreign Application Priority Data
Mar. 2, 2017 (EP) .................................... 17158812

(51) Int. Cl.
*F16M 11/00* (2006.01)
*E04G 21/04* (2006.01)
*B60S 9/02* (2006.01)

(52) U.S. Cl.
CPC ..... *E04G 21/0445* (2013.01); *E04G 21/0436* (2013.01); *B60S 9/02* (2013.01)

(58) Field of Classification Search
CPC .. E04G 21/0445; E04G 21/0436; F16M 11/22
See application file for complete search history.

(56) References Cited

U.S. PATENT DOCUMENTS

| 6,390,504 B1* | 5/2002 | Fetzer ................. E04G 21/0436 280/763.1 |
| 2010/0139792 A1* | 6/2010 | Rau ..................... E04G 21/0436 340/12.51 |

(Continued)

FOREIGN PATENT DOCUMENTS

| CN | 202358069 U | 8/2012 |
| CN | 102874313 A | 1/2013 |

(Continued)

OTHER PUBLICATIONS

Korean Examination Report for Application No. 10-2019-7026029 filed Sep. 4, 2019, dated Dec. 28, 2020; 13 pgs.

(Continued)

*Primary Examiner* — Amy J. Sterling
(74) *Attorney, Agent, or Firm* — Alix, Yale & Ristas, LLP

(57) ABSTRACT

The supporting structure for a mobile concrete pump for connecting a distribution boom includes two support leg boxes that cross each other diagonally, and a boom pedestal attached thereto having a turret that has an opening that is surrounded at its one end at least partially by a pivot mount receptacle for a pivot bearing for pivoting the distribution boom of the concrete pump with respect to the turret. Part of the wall of the turret is formed by a side wall of the supporting leg boxes that cross each other, wherein the side walls of the supporting leg boxes are, in a first region in which same form part of the wall of the turret, free of joining points such that loads introduced via the turret directly into (Continued)

the side walls are distributed beyond the first region without shear load of a joining point in the side walls.

9 Claims, 5 Drawing Sheets

(56) References Cited

U.S. PATENT DOCUMENTS

| | | | | |
|---|---|---|---|---|
| 2011/0134413 A1* | 6/2011 | Has | ........................ | F24C 7/082 |
| | | | | 356/51 |
| 2016/0123600 A1* | 5/2016 | Phillips | ................... | F24C 7/082 |
| | | | | 99/337 |
| 2016/0145880 A1* | 5/2016 | Mapelli | ................... | B60K 6/52 |
| | | | | 222/627 |
| 2017/0260761 A1* | 9/2017 | Fügel | ................. | E04G 21/0436 |
| 2017/0367151 A1* | 12/2017 | Rafii | .................... | H05B 6/1218 |
| 2019/0089872 A1* | 3/2019 | Rukes | .................... | G03B 17/55 |
| 2021/0087838 A1* | 3/2021 | Benz | .................. | E04G 21/0436 |

FOREIGN PATENT DOCUMENTS

| | | |
|---|---|---|
| CN | 103147574 A | 6/2013 |
| CN | 203065022 U | 7/2013 |
| CN | 102561696 B | 4/2015 |
| CN | 105392945 A | 3/2016 |
| CN | 205855932 U | 1/2017 |
| EP | 1418151 A1 | 5/2004 |
| JP | H02232467 A | 9/1990 |
| JP | 2001003389 A | 1/2001 |
| JP | 2008149945 A | 7/2008 |
| KR | 20150045936 A | 4/2015 |
| WO | 2014029552 | 2/2014 |
| WO | 2015198089 A1 | 12/2015 |

OTHER PUBLICATIONS

International Search Report dated Apr. 20, 2018, for International Patent Application No. PCT/EP2018/055209.

* cited by examiner

SUPPORTING STRUCTURE HAVING
INTEGRATED TURRET FOR A MOBILE
CONCRETE PUMP AND MOBILE
CONCRETE PUMP

FIELD

The invention relates to a supporting structure for a mobile concrete pump and to a mobile concrete pump with a corresponding supporting structure.

BACKGROUND

Mobile concrete pumps generally have a boom which is arranged on a mobile substructure—generally a heavy goods vehicle chassis—and which is pivotable relative to the substructure and which has, guided along it, a conveying line through which flowable concrete can be conveyed by means of a concrete pump arranged on the substructure. Here, the boom comprises multiple boom arms which can be pivoted relative to one another about axes in each case transverse with respect to the longitudinal direction of the boom arm.

In order to ensure the stability of the concrete pump during use, the boom is connected by means of a supporting structure to the heavy goods vehicle chassis. Here, the supporting structure comprises support legs by means of which said supporting structure can be supported on the ground such that the load moments caused by the boom arm are introduced into the ground exclusively via the support legs and not by the heavy goods vehicle chassis.

For mobile concrete pumps, supporting structures are known which have—as viewed in a direction of travel of the heavy goods vehicle chassis—two front telescopic support legs and two rear pivotable support legs. The front support legs are in this case arranged in support leg boxes, which cross one another in an X shape in plan view, of the supporting structure, to which support leg boxes the rear support legs are also pivotably connected.

The boom is attached via a so-called turret to the supporting structure. Here, the turret comprises a hollow body with a mount arranged on the top side thereof, which mount serves for the rotatable connection of the boom. Here, the turret is arranged in front of the crossing point of the support leg boxes in a direction of travel of the heavy goods vehicle chassis, and is generally connected directly to the support leg boxes.

The connection of the turret to the rest of the supporting structure is generally realized by means of joining, in particular by means of welding. Owing to the high load by the boom, which must be dissipated via the weld seams, said weld seams must be formed and checked with particular care, which makes the production thereof cumbersome and expensive. This also applies to the weld seams on any supporting or reinforcement ribs that may be provided.

WO 2014/029552 describes a supporting structure for a mobile concrete pump, in the case of which the turret has a polygonal outline and is fitted into a matching polygonal opening in the supporting structure. Here, parts of the turret may be arranged flush with a side wall of a support leg box and replace this in certain portions. Even though, in the case of a turret as per WO 2014/029552, the introduction of force into the supporting structure is already improved in relation to the other prior art, the at least four weld seams required for the direct connection of the turret to the supporting structure must still be formed so as to be particularly resistant to load. Weld seams for any supporting or reinforcement ribs that may be provided are also subjected to high loading.

It is an object of the present invention to provide a supporting structure, which is improved in relation to the prior art, for a mobile concrete pump, and a mobile concrete pump.

Said object is achieved by means of a supporting structure according to the main claim and by means of a concrete pump according to the coordinate claim 9. The dependent claims relate to advantageous refinements.

SUMMARY

Accordingly, the supporting structure relates for a mobile concrete pump for the connection of a distributor boom, comprising two support leg boxes which cross one another diagonally, and a boom pedestal which is fastened to said support leg boxes and which has a turret which has an opening which, at one end thereof, is at least partially surrounded by a mount for a rotary bearing for the pivoting of the distributor boom of the concrete pump relative to the turret, wherein in each case one part of the wall arrangement of the turret is formed by a side wall of the support leg boxes which cross one another, and wherein the side walls of the support leg boxes are each, in the first region in which they form a part of the wall arrangement of the turret, free from joining points such that loads introduced via the turret into the side walls are distributed beyond the first region without shear loading of a joining point in the side walls.

Furthermore, the invention relates to a mobile concrete pump comprising a supporting structure which is fastened on a mobile substructure and which has extendable support legs which are arranged on the supporting structure and which serve for supporting the concrete pump on the ground, and comprising a distributor boom mounted rotatably on the supporting structure, wherein the supporting structure is designed according to the invention.

Firstly, some of the expressions used in conjunction with the invention will be explained:

The entire region of a side wall of a support leg box in which the side wall forms a part of the wall arrangement of the turret is referred to in the context of the invention as first region of the side wall.

A component or a region of a component is "free from joining points" if the component as a whole, or at least in the region in question, is not composed of multiple previously separate workpieces that are merely connected by joining points. If a first component is connected by means of joining points to a further component, the first component is however still regarded, under the stated conditions, as being free from joining points within the meaning of the invention.

A component is "free from joining points such that, in the presence of a predefined load, no shear loading occurs at joining points of the component" if, in the presence of a predefined load, the force flow through the component crosses any joining points that may be provided substantially only orthogonally, and thus no load arises in a shear direction at the joining points.

For example, a load on the turret during the operation of the concrete pump can generate a force flow which runs substantially in a vertical direction. The first region of a side wall of a support leg box is in this case free from joining points which run substantially parallel to the vertical, and preferably has only substantially horizontally running joining points, which are intersected orthogonally by the force flow. Depending on the type of construction of the supporting structure, force flows pointing in other directions may also arise during operation.

Where, in the context of the invention, a part of the wall arrangement of the turret is formed by a side wall of a support leg box, this means that the side wall directly forms a part of the wall arrangement of the turret. The shape of the side wall is in this case such that it replicates the shape of the corresponding part of the wall arrangement of the turret. By virtue of the fact that, according to the invention, in each case one part of the wall arrangement of the turret is formed by a side wall of the support leg boxes which cross one another, the two support leg boxes which cross one another contribute, by way of their respective first region, to the completion of the wall arrangement of the turret. In this way, together with the first regions of the respective support leg boxes, a complete turret is formed, the shape of which is optimized for the transmission of the loads from the boom into the support leg boxes.

The two first regions of the side walls extend in each case preferably to the opening of the turret at which the rotary bearing for the pivoting of the distributor boom is arranged. In this way, the loads from the distributor boom can be dissipated directly into the respective first regions of the side walls and from there directly into the support leg boxes.

By virtue of the fact that a part of the wall arrangement of the turret is formed directly by in each case one side wall of the support leg boxes, at least a part of the load introduced by the distributor boom into the turret is introduced into the side walls directly—that is to say in particular not via joining points subjected to shear loading. Here, according to the invention, the side walls are free from joining points such that that part of the loads which is introduced directly into a side wall is, via that first region of the side wall which directly form a part of the turret wall arrangement, distributed beyond the side wall and thus into the support leg boxes, wherein, in the side wall itself, no provision whatsoever is made of joining points—for example a weld seam—which would be subjected to shear owing to the load from the distributor boom. In the typical installation situation of a supporting structure, this means that in particular no vertical joining points are provided in said region of the side walls. The introduction of force into the side walls in question of the support leg boxes, and thus into the support leg boxes as a whole, is thus advantageous, wherein said side walls may self-evidently be connected by means of joining points to the other walls of the support leg boxes or other components.

In relation to the prior art with one continuous turret wall arrangement, it is thus in particular not necessary in the case of the solution according to the invention for the entire acting force flow to be transmitted into the supporting structure via one or more heavily shear-loaded weld seams by means of which the turret is connected to the supporting structure. Rather, according to the invention, a part of the load is already introduced directly via the side walls of the support leg boxes into the supporting structure. The force flow to be transmitted from those parts of the turret which are not formed directly by the side walls of the support leg boxes into the supporting structure accordingly likewise constitutes only a part of the entire load. All of the joining points arranged in this path of the force flow, such as for example weld seams, are accordingly also subjected to only lower load than the weld seams in the prior art, and can consequently be formed at lower cost.

It is preferable if the side walls of the support leg boxes are entirely free from joining points that are subjected to shear loading by the loads that are introduced via the turret directly into the side walls. In other words, it is the intention that joining points that would be subjected to shear loading by the load that is introduced into the side wall via the region of one part of the wall arrangement of the turret be omitted in the side walls not only directly in the region in which said side walls form part of the turret wall arrangement but overall.

It is preferable if the two side walls, which each form parts of the wall arrangement of the turret, of the support leg boxes are directly connected to one another by means of a common abutting edge. The side walls of the support leg boxes are thus formed such that, in an assembled supporting structure, said side walls abut against one another in the region of the turret wall arrangement, whereby, inter alia, the wall arrangement of the turret is also closed in this region. In order to increase the load-bearing capacity and stiffness of the supporting structure overall, it is advantageous here for the two side walls to be connected to one another at precisely this abutting edge, for example by joining or welding. The joining point that is thus formed connects the two side walls, which themselves however remain free from joining points in the regions intended according to the invention.

Alternatively, it is possible that a transition plate which forms a part of the wall arrangement of the turret is provided between the two side walls. The transition plate may be connected to the two side walls by joining in order to further improve the stiffness of the supporting structure. Here, the side walls however remain free from joining points subjected to shear loading within the meaning of the invention.

It is preferable if at least one, preferably both, side wall(s) extend(s) in a manner free from joining points beyond the respective support leg box to the mount for the rotary bearing. If the mount of the turret for the rotary bearing is situated above the support leg boxes, the side walls project, according to the invention, beyond the respective support leg boxes to the mount for the rotary bearing. If this part of the side walls which projects beyond the support leg boxes is entirely free from joining points, this increases the stability of the supporting structure.

It is preferable here if the shaping of those parts of the side walls which extend beyond the support leg boxes has the least possible stress concentration. The parts in question of the side walls should thus be shaped such that adversely high stress peaks in the side walls, which could lead to damage thereto, are as far as possible avoided by means of suitable shaping.

It is preferable if the wall arrangement of the turret is, in the regions outside the regions formed by the side walls of the support leg boxes, formed by a single-piece, singly or multiply angled or rounded plate, wherein the plate is preferably connected by welding to the support leg boxes. By virtue of the fact that, outside the side walls, the turret is formed by a single-piece plate, the number of joining points subjected to shear loading in the region of the turret can be reduced to a minimum. The connections between the stated plate and the side walls may basically be produced by means of any desired joining methods, though a welded connection is preferable.

The mount for a rotary bearing is formed as a preferably fully encircling bearing flange, which preferably lies on the wall arrangement of the turret and is furthermore preferably welded thereto. By virtue of the mount being formed as an encircling bearing flange, an advantageous introduction of force into the turret or the wall arrangement thereof is ensured. The weld seam between the mount for the rotary bearing and the wall arrangement of the turret is in this case generally not subjected to shear loading.

For the explanation of the concrete pump according to the invention, reference is made to the statements above.

BRIEF DESCRIPTION OF THE DRAWINGS

The invention will now be described by way of example on the basis of advantageous embodiments and with reference to the appended drawings, in which.

DETAILED DESCRIPTION

Figure 1:
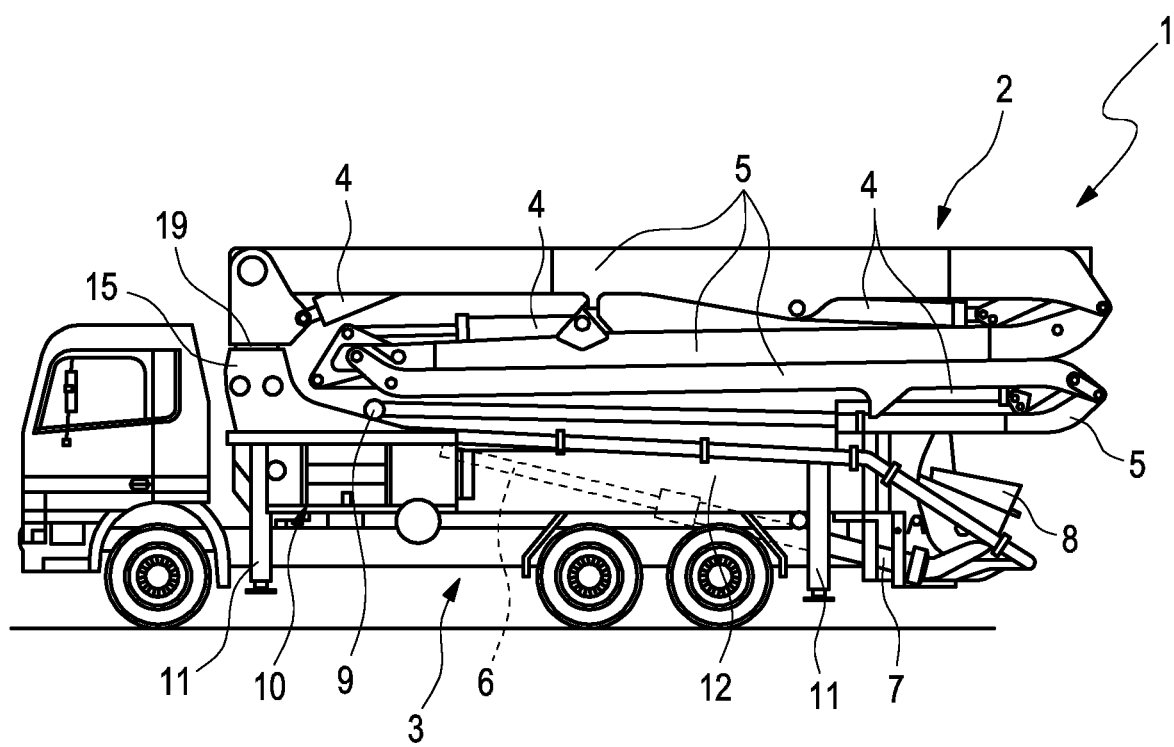
FIG. 1 shows a side view of a first exemplary embodiment of a concrete pump according to the invention with supporting structure according to the invention.
Figure 2:
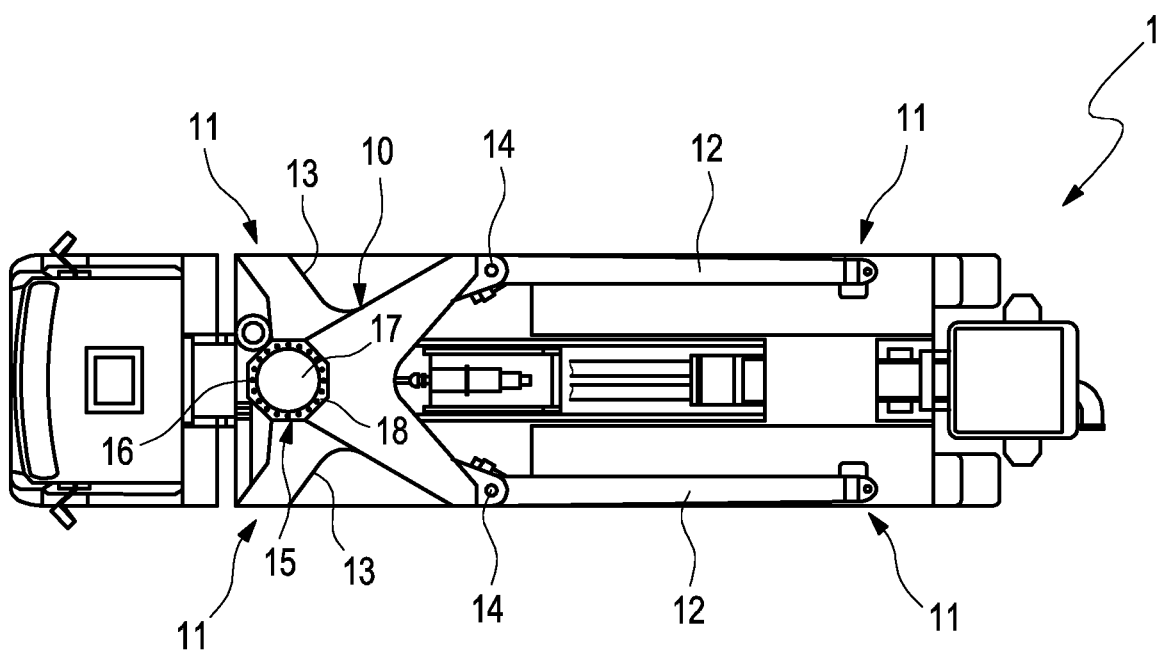
FIG. 2 shows a plan view of the concrete pump from FIG. 1 without distributor boom.

In the case of the mobile concrete pump 1 with distributor boom 2 as illustrated in FIGS. 1 and 2, the distributor boom 2 (illustrated only in FIG. 1) is fastened rotatably on a mobile substructure 3. The distributor boom 2 comprises multiple parts 5, which can be deployed by means of hydraulic cylinders 4 and in which there is led a conveying line 6 (only partially illustrated) for flowable concrete. By means of a concrete pump 7 arranged on the substructure 3, flowable concrete can be conveyed from the feed hopper 8 through the conveying line 6 to the free open end 9 of the conveying line 6.

In order to ensure the stability of the concrete pump 1 during the use thereof—and thus in particular during the extension and/or pivoting of the distributor boom 2—the distributor boom 2 is connected to the substructure by means of a supporting structure 10. On the supporting structure 10, there are provided a total of four support legs 11, of which the two front support legs 11 can be deployed telescopically and the two rear support legs 11 can be pivoted out laterally by means of boom arms 12. For this purpose, the supporting structure 10 has two support leg boxes 13, which cross one another diagonally and in which the telescopic tubes for the front support legs 11 are arranged, and bearing points 14 for the boom arms 12.

For the rotatable connection of the distributor boom 2 to the substructure 3, a boom pedestal 15 is provided which is fastened to the supporting structure 10. The boom pedestal 15 comprises a turret 16 with an opening 17 through which the conveying line 6 is led from the concrete pump 7 to the distributor boom 2. At one end of the opening 17, the turret 16 has a mount 18 for a rotary bearing 19 by means of which the distributor boom 2 can ultimately be pivoted relative to the substructure 3.

By virtue of the boom pedestal 15 being a direct part of the supporting structure 10, it is ensured that the loads introduced by the distributor boom 2 can be introduced directly via the supporting structure 10 and the extended support legs 11 into the ground, without the substructure 3 of the concrete pump 1 being subjected to load.

Figure 3:
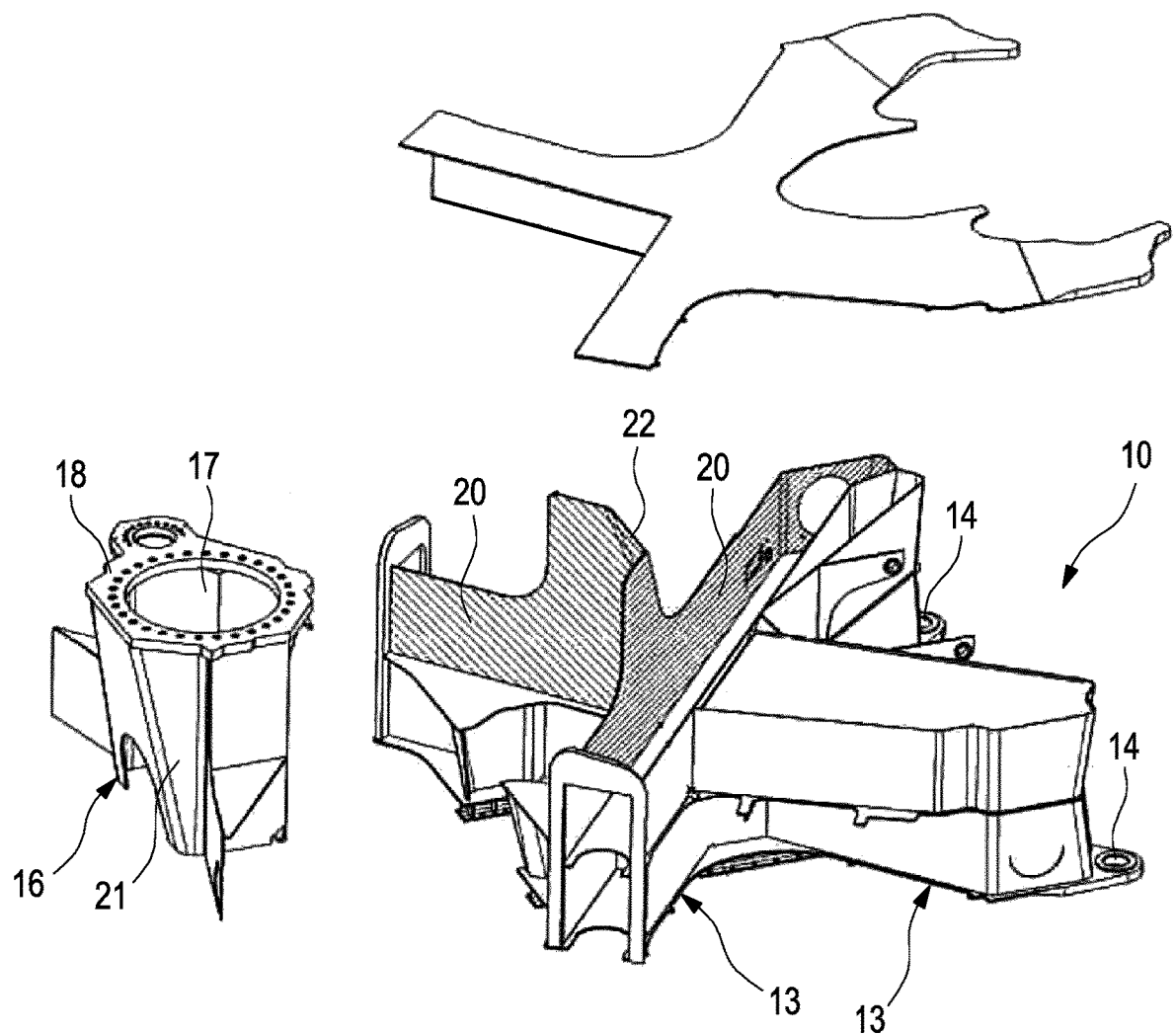
FIG. 3 is an exploded illustration of the supporting structure of the concrete pump as per FIGS. 1 and 2.

FIGS. 3 and 4a, b illustrate the supporting structure 10 of the concrete pump 1 in detail. In FIG. 3, for illustration purposes, parts of the turret 16 and of the support leg boxes 13 have been illustrated spaced apart from the other parts of the supporting structure 10. FIGS. 4a, b shows the supporting structure 10 in the fully assembled state.

The support leg boxes 13, which cross one another diagonally, of the supporting structure are of two-level construction, such that, in the support leg boxes 13, in each case one telescopic tube can be arranged in different planes in order that the telescopic tubes can cross at the intersection point of the support leg boxes 13. The connection points 14 for the boom arms 12 are arranged directly on the support leg boxes 13.

The entire supporting structure 10 is a welded plate structure, that is to say the supporting structure 10 is formed from a multiplicity of plates which are connected to one another by weld seams. This includes inter alia the side walls 20 of the support leg boxes 13, the multiply angled wall plate 21 of the turret 16 and the mount 18 for the rotary bearing 19, which is formed as a bearing flange.

The side walls 20 of the support leg boxes 13 are formed such that, in the assembled state of the supporting structure 10, in a first region 24 of the side walls 20, they form a part of the wall arrangement of the turret 16, which is completed by the angled wall plate 21. To form a common upper edge, the side walls 20 project beyond the support leg boxes 13 themselves in the region of the turret 16, wherein, in particular, said part of the side walls 20 is designed so as to yield the least possible stress concentration in the presence of the expected load from the distributor boom 2. The mount 18 is fastened on the wall arrangement of the turret 16—that is to say the parts in question of the side walls 20 and the wall plate 21—such that the mount 18 surrounds the central opening 17 formed by the wall arrangement of the turret 16. The individual components of the turret 16 are in this case connected to one another by weld seams.

The side walls 20 of the support leg boxes 13 are formed as a single piece and are thus entirely free from joining points. In particular, within the side walls 20, there are provided no vertical joining points or weld seams which would be subjected to shear loading by the loads introduced into the turret 16 or the supporting structure 10 via the mount 18. The forces introduced directly into the side walls 20 via the mount 18 are thus advantageously distributed over the entirety of the side walls 20, without a joining point being subjected to high loading in the process. The loads introduced into the other wall of the turret 16, formed by the wall plate 21, are introduced via the connecting weld seams into the side walls 20, though can likewise be distributed over the entirety of the side walls.

The two side walls 20 abut directly against one another in the region of the side boxes 13 and are welded to one another there. Above the support leg boxes 13, a transition plate 22 is provided between the two side walls 20, on which transition plate a part of the mount 18 ultimately comes to lie. The transition plate 22 is fastened to the two side walls 20 by means of a weld seam.

Figure 4:
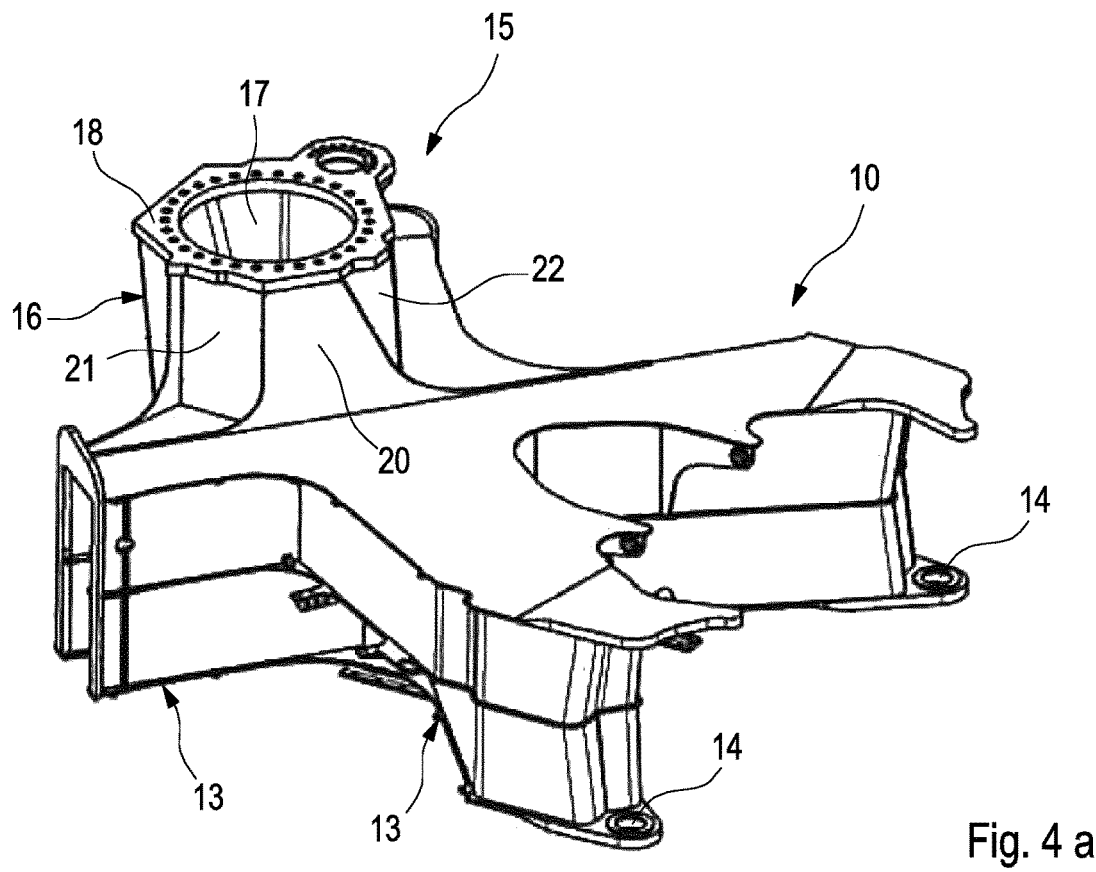
FIGS. 4a, b are detail illustrations of the supporting structure from FIG. 3.
Figure 4:
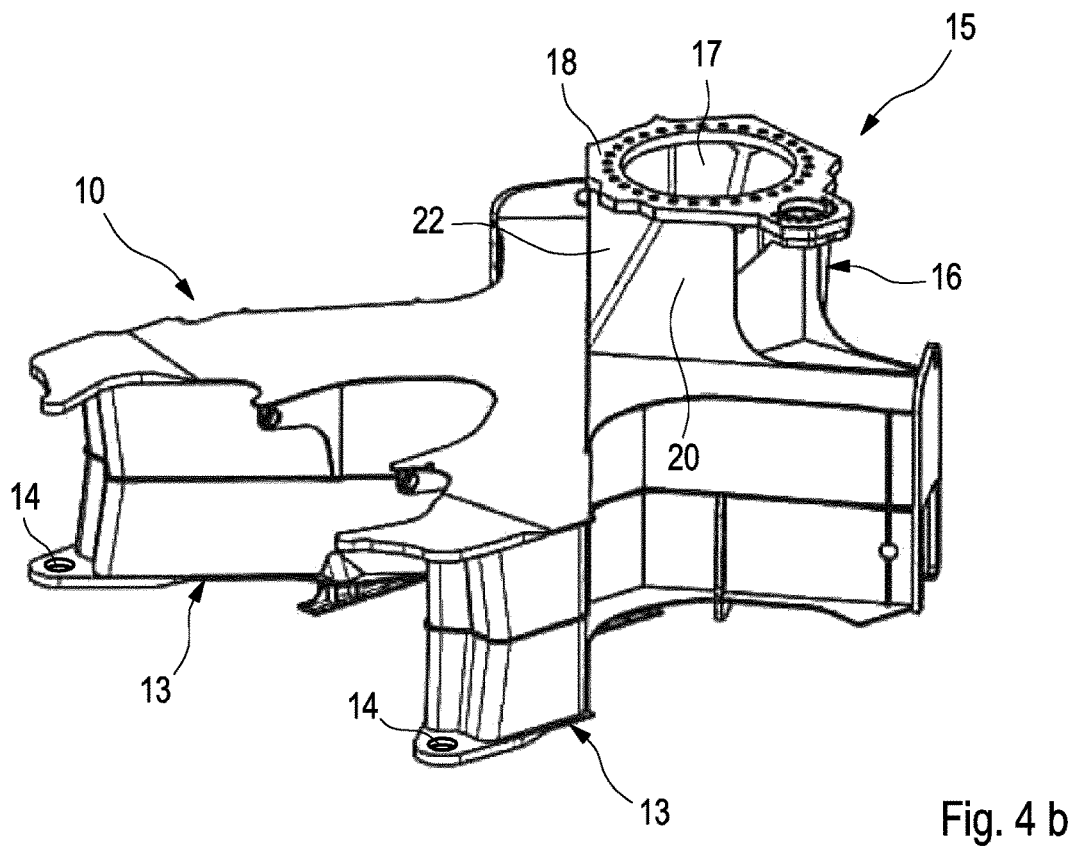
Figure 5:
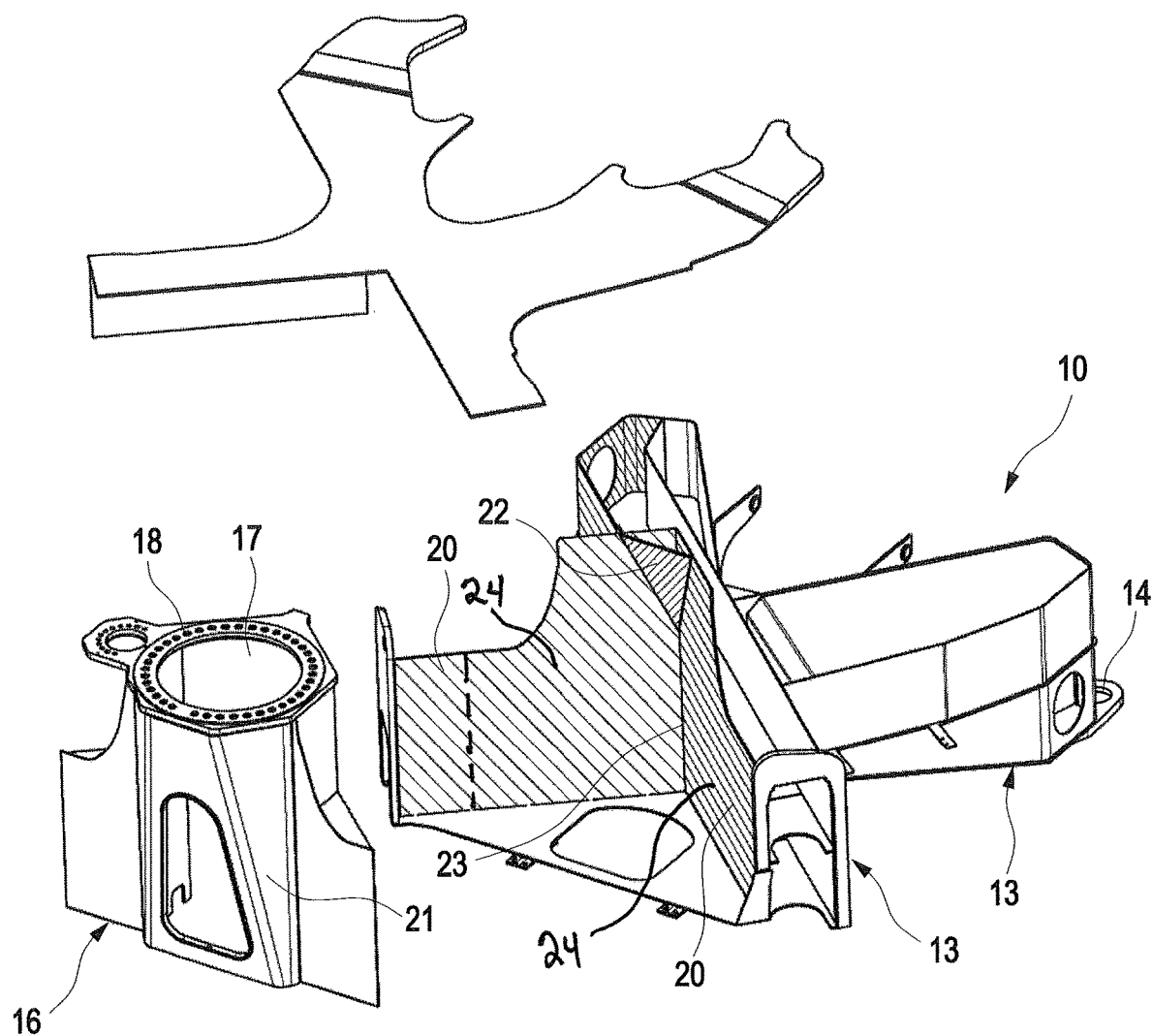
FIG. 5 shows a first design variant of the supporting structure as per FIGS. 3 and 4.
Figure 6:
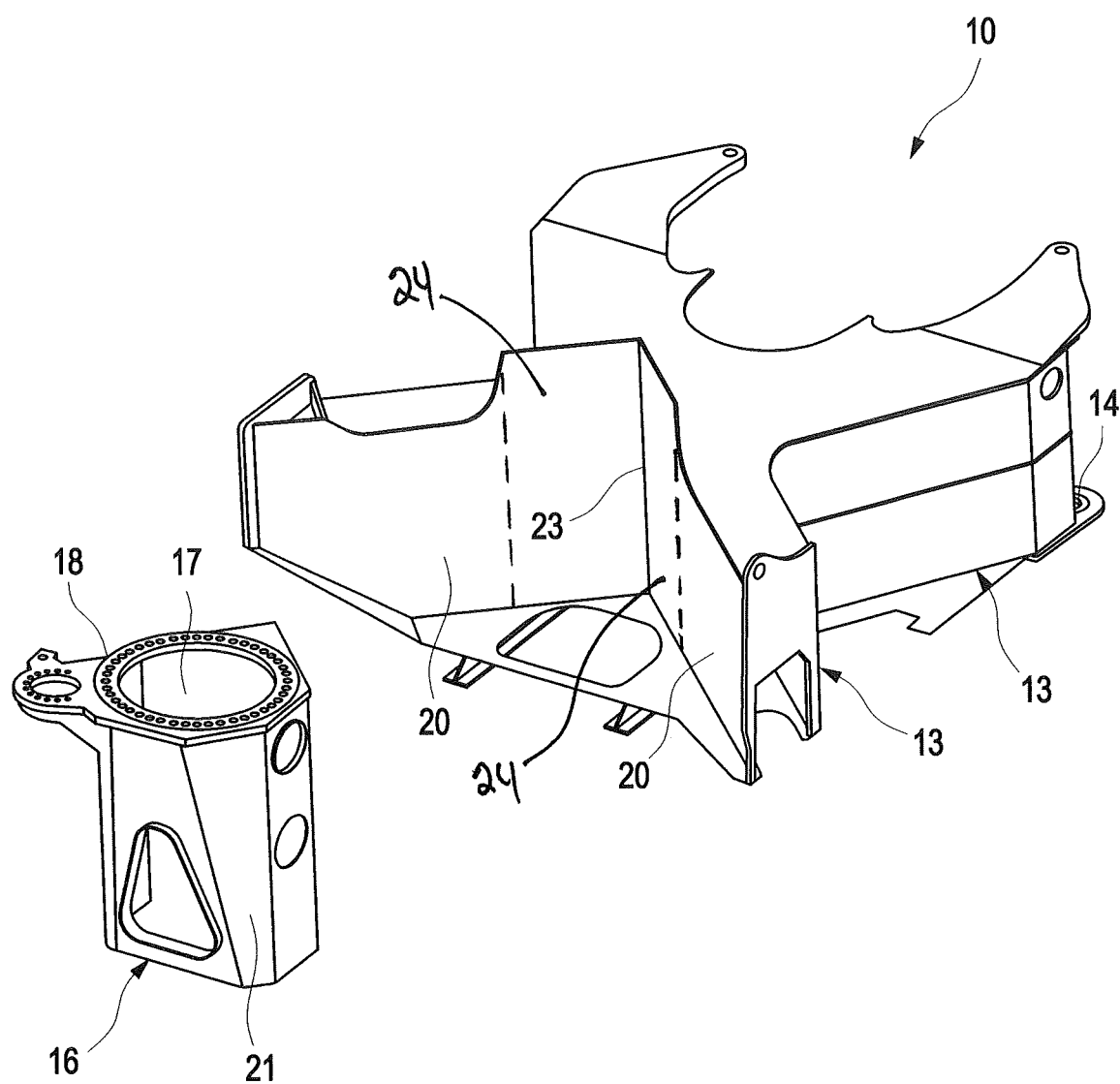
FIG. 6 shows a second design variant of the supporting structure as per FIGS. 3 and 4.

FIGS. 5 and 6 show design variants of the supporting structure 10 from FIGS. 3 and 4a, b. Here, the supporting structures 10 substantially correspond to the structure described above, for which reason only the differences in relation to the supporting structure 10 illustrated in FIGS. 3 and 4a, b will be discussed below. The statements relating to FIGS. 1 to 4 otherwise apply analogously.

In the design variant as per FIG. 5, the side walls 20 have, as far as the mount 18, a common abutting edge 23 at which they are also welded to one another. The transition plate 22 is nevertheless provided as an additional stiffening means.

In the design variant as per FIG. 6, the common abutting edge 23 of the side walls 20 likewise extends to the mount 18. By contrast, a transition plate 22 is not provided, because the rest of the construction of the supporting structure is already adequately stable and rigid. The mount 18 for the rotary bearing 19 is formed so as to lie on the side walls 20 or the wall plate 21 over the entire circumference.

The invention claimed is:

1. A supporting structure for a mobile concrete pump for the connection of a distributor boom, comprising two support leg boxes which cross one another diagonally, and a boom pedestal which is fastened to said support leg boxes and which has a turret (16) which has an opening which, at one end thereof, is at least partially surrounded by a mount for a rotary bearing for the pivoting of the distributor boom of the concrete pump relative to the turret, wherein in each case one part of the wall arrangement of the turret is formed by a side wall of the support leg boxes which cross one another, wherein the side walls of the support leg boxes are, in a first region in which they form a part of the wall arrangement of the turret, free from joining points such that loads introduced via the turret directly into the side walls are distributed beyond the first region without shear loading of a joining point in the side walls.

2. The supporting structure of claim 1, wherein the side walls of the support leg boxes are entirely free from joining points that are subjected to shear loading by the loads that are introduced via the turret directly into the side walls.

3. The supporting structure of claim 1, wherein the two side walls, which each form parts of the wall arrangement of the turret, of the support leg boxes are directly connected to one another by means of a common abutting edge.

4. The supporting structure of claim 1, wherein a transition plate which forms a part of the wall arrangement of the turret is provided between the two side walls.

5. The supporting structure of claim 1, wherein at least one, preferably both, side wall(s) extend(s) in a manner free from joining points beyond the respective support leg box to the mount for the rotary bearing.

6. The supporting structure of claim 4, wherein the shaping of those parts of the side walls which extend beyond the support leg box has the least possible stress concentration.

7. The supporting structure of claim 1, wherein the wall arrangement of the turret is, in the regions outside the parts formed by the side walls of the support leg boxes, formed by a single-piece, singly or multiply angled or rounded plate, wherein the plate is preferably connected by welding to the support leg boxes.

8. The supporting structure of claim 1, wherein the mount for a rotary bearing is formed as a preferably fully encircling bearing flange, which preferably lies on the wall arrangement of the turret and is furthermore preferably welded thereto.

9. A mobile concrete pump comprising the supporting structure of claim 1 which is fastened on a mobile substructure, said supporting structure includes extendable support legs which are arranged on the supporting structure and which serve for supporting the concrete pump on the ground, said mobile concrete pump comprising a distributor boom mounted rotatably on the supporting structure.

* * * * *